(12) United States Patent
Singh et al.

(10) Patent No.: US 11,660,916 B2
(45) Date of Patent: May 30, 2023

(54) MULTIPLE HITCH ASSEMBLY

(71) Applicant: Advanced Engineering Group, LLC, Valencia, CA (US)

(72) Inventors: Arvinder Singh, Valencia, CA (US); Hardeep Singh, Valencia, CA (US); Jeff Good, Cayucos, CA (US)

(73) Assignee: Advanced Engineering Group, LLC, Valencia, CA (US)

( * ) Notice: Subject to any disclaimer, the term of this patent is extended or adjusted under 35 U.S.C. 154(b) by 289 days.

(21) Appl. No.: 17/223,889

(22) Filed: Apr. 6, 2021

(65) Prior Publication Data

US 2021/0237524 A1 Aug. 5, 2021

Related U.S. Application Data

(63) Continuation-in-part of application No. 16/518,471, filed on Jul. 22, 2019.

(60) Provisional application No. 62/711,771, filed on Jul. 30, 2018.

(51) Int. Cl.
| | |
|---|---|
| *B60D 1/07* | (2006.01) |
| *B60D 1/06* | (2006.01) |
| *B60D 1/04* | (2006.01) |
| *B60D 1/46* | (2006.01) |
| *B60R 3/00* | (2006.01) |
| *B60D 1/52* | (2006.01) |

(52) U.S. Cl.
CPC ................. *B60D 1/07* (2013.01); *B60D 1/04* (2013.01); *B60D 1/065* (2013.01); *B60D 1/46* (2013.01); *B60D 1/52* (2013.01); *B60R 3/007* (2013.01)

(58) Field of Classification Search
CPC . B60D 1/04; B60D 1/07; B60D 1/065; B60D 1/46; B60D 1/52; B60R 3/007

USPC ....................................................... 280/490.1
See application file for complete search history.

(56) References Cited

U.S. PATENT DOCUMENTS

| | | | |
|---|---|---|---|
| 5,839,744 A * | 11/1998 | Marks ................. | B62D 53/021 280/511 |
| 6,460,870 B2 | 10/2002 | Moss | |
| 8,366,133 B2 | 2/2013 | Brinkley | |
| 10,336,145 B1 | 7/2019 | Dunn et al. | |
| 11,325,434 B2 * | 5/2022 | Pennington ............. | B60D 1/46 |

(Continued)

FOREIGN PATENT DOCUMENTS

WO    WO02064385 A2    8/2002

OTHER PUBLICATIONS

Screenshot of Reese Towpower Rotating Tri-Ball retrieved from Blains Farm and Fleet online store, www.farmandfleet.com.

*Primary Examiner* — Minnah L Seoh
*Assistant Examiner* — Felicia L. Brittman
(74) *Attorney, Agent, or Firm* — Apex Juris, PLLC; R Wylie; Tracy Heims

(57) ABSTRACT

A multiple hitch assembly and method of use thereof including a hitch platform having a channel member and multiple hitch member having a block base.
A dampening member may be affixed such that coupling of the multiple hitch member by locked engagement of received through holes of the block base and paired side holes disposed in flanges of the channel member compresses the dampening member upon the recessed column of the hitch platform to absorb and thus attenuate the load and associated torque imparted by movement and rub between the hitch platform and multiple hitch member to thereby reduce associated rattle noise, and vibration.

20 Claims, 10 Drawing Sheets

(56) References Cited

U.S. PATENT DOCUMENTS

2019/0275850 A1 9/2019 Pucheu
2019/0315168 A1 10/2019 Rotenberg

* cited by examiner

MULTIPLE HITCH ASSEMBLY

CROSS-REFERENCE TO RELATED APPLICATIONS

This application claims priority to and benefit under 35 USC § 119(e) of U.S. patent application Ser. No. 16/518,471 having a filing date of Jul. 22, 2019, which claims priority to and benefit under U.S. Provisional Patent Application Ser. No. 62/711,771 having a filing date of Jul. 30, 2018, which are both hereby incorporated by reference herein.

FIELD OF THE INVENTION

This invention relates to the field of tow accessories, particularly a multiple hitch assembly that may include hitch a step hitch member including one or more hitch balls, tow hooks and rings together with a dampening mechanism for reducing the relative movement and rattling between a tow accessory base and hitch receiver.

BACKGROUND OF THE INVENTION

Many vehicles today are equipped with receiver-type trailer hitches. These types of trailer hitches typically are a square tube, normally 1¼ or 2" (3.2 cm or 5 cm) internal height and width, attached to the undercarriage of the vehicle. A second tube acts as a shank and includes outer dimensions slightly smaller than the internal dimensions of the receiver tube and is slidable within the receiver tube. The shank member is connected to the receiver tube by a secured pin inserted through the two tubes.

The shank member may include a standard single or dual ball-mount for engaging with the hitch of a trailer or other wheeled vehicle. Another popular use for receiver hitches is the use as a coupling device for installing equipment racks, ski carriers, storage boxes and other types of carriers having a second tube dimensioned to engage within a receiver hitch tube. This provides a universal system that allows a vehicle user to be able to use various trailer and carriers with a single coupling system.

A particular problem with the use of these receiver coupling systems is play between the receiver hitch platforms and hitch ball or direct tow accessory assemblies. The base of the tow mount or accessory tends to rattle or chatter within the channel of the hitch platform. This rattle or chatter is at best an annoyance and at worst can distract the driver or cause damage to the trailer or the carrier.

There have been a number of attempts to solve this problem in the past. Such attempts typically required the use of specially designed and dedicated receivers, shanks, or mechanisms that typically adapt size and fasteners to stabilize junctures between hitch assemblies.

One such prior art hitch assembly addressing the latter problems is shown in the prior art height adjustable dual hitch ball flange platform assembly shown, described and claimed in U.S. Pat. No. 8,033,563. The latter patented hitch assembly employs two locking pins on an upper and lower section of the dual hitch ball base inserted through corresponding holes in the double flanges to secure and stabilize the hitch ball base at an appropriate height within a vertical channel formed between two outwardly extending flanges.

Although the latter dual pin mount provided the substantial improvements of reduced play, rattling and pivoting of the hitch assembly relative to the vehicle, movement and vibration due to loosening and play between the tow accessory member and hitch receiver platform persists. Such movement, vibration and noise is exacerbated if the tow accessory is installed on an upper or lower section of the channel and thus not evenly supported along the base of the tow accessory. Such eccentric positioning of the hitch ball along the hitch platform channel and resulting movement causes vibrations and gyrating movement. In extreme driving terrain or weather conditions, even hazardous swaying of the vehicle may result.

Prior art devices further include inserting a rubber device into apertures of a universal tow platform, which preferably fills three apertures adjacent to opposing sides and rear surface or the hitch accessory to snugly secure the hitch ball and thereby dampen movement and rattling. However, since the rubber device is installed in the hitch platform, the hitch ball may not align with the rubber device in all positions, particularly when a dual flange ball that is installed on the uppermost or lowermost portion of the platform.

Although the latter device provided an improvement over prior art hitch assemblies and reduced rocking, swaying and pivoting of the hitch assembly relative to the vehicle, issues arising from loose rattling between the tow accessory member and hitch receiver platform persists. As is readily surmised from consideration of impacts and resulting external forces exerted upon a vehicle and any towed accessory will shake and exert commensurate stress loosening abutting rigid metal surfaces of the hitch assembly and will resonate toward edges of the hitch ball base and platform, resulting in rattling and possible swaying of the vehicle.

Such vibration, noise and directional interference with safely steering the car may be exacerbated if the hitch ball or tow accessory are not tightly compressed along the channel of the platform. This is particularly problematic if the hitch ball mount tow accessory is installed on an uppermost or lowermost end of the channel where the entire length of the hitch ball mount base is not supported along the channel of the tow accessory, which is a particularly prevalent issue associated with dual flange ball. When in upper and lower mounted positions, the base may extend beyond the channel and flanges support exacerbating movement causing rattling and vibrations and may even cause veering, swaying, gyrating and even dangerous pivoting to one side or another of the vehicle that is difficult. This rattle or chatter is at best an annoyance and at worst can distract the driver or cause damage to the vehicle or tow accessory. In extreme driving terrain or weather condition, the swaying or pivoting of the vehicle may be impossible to control.

The drawbacks of unattenuated rattle or sway may be exacerbated when multi-purpose hitch mounts with more complex structures are used. In particular, multiple hitch mounts including, for example, hitch mounts may be provided with variously sized dual or triple socket-type balls in a variety of sizes that are typically engineered by soldering or welding fitted surfaces of the respective balls. Hence, a single hitch mount accessory can be used to hitch correspondingly variously sized sockets of a trader can be hitched to the tow vehicle. With the increased size and density of the multiple use hitch assembly, the load and associated tensile stress on the pin or pins securing the main hitch member to the hitch receiver transmitted when pulling and braking loads between the tow vehicle and the trader is commensurately increased. The convergence of the load stress on the tow hitch and pin mount thus limit the tolerance levels of conventional tow hitch accessory mounts.

A yet further feature combined with tow mounts are hitch steps to facilitate access to spaces on or in the towing vehicle that are out of reach, such as, for example, in truck beds, rooftops or utility vehicle stowage areas. The multifunctionality imparted to such multiple hitch assemblies provide substantial efficacies of a single mufti-use device saving stowage space and fewer pieces to track and find when needed. However, drawbacks associated with the bulk and density as well as piecemeal joining, typically by soldering or welding, of corresponding mated surfaces of the each of the three balls as well as the step may compromise the strength and durability of conventional triple ball mounts. Unfortunately, the impact and torque exerted by the physical load together with the vibration and pressure from the pulling and pushing on the adjoined surfaces and fastener pins of conventional triple ball tow hitch may erode and loosen the adjoined surfaces of components of conventional multiple function hitch mounts thereby compromising their strength, durability and safety.

Moreover, the bulk and density of such multifunctional tow mounts exacerbate the vibrational rattle and sway caused by friction between abutting metal surfaces of the hitch and socket and attachment hardware, such as fastener pins securing a telescoped tow shank into the receiver tube of the towing vehicle.

Yet another disadvantage attendant to conventional mounts for triple ball mounts is the lack of height adaptability. Thus, although the variously sized balls accommodate different socket sizes of tow accessories, they are not adjustable to the height of a particular trailer or other equipment being towed. Towing vehicle hitch heights, for example, between a highly suspended, four-wheel pickup truck as compared to a standard car, may vary considerably. Trailers and other towed equipment and their tow bars also vary in height. This is a particular problem if the towing vehicle hitch receiver sits relatively low to the ground and alternatively and a relatively high trailer exerts a lifting action on the back end and wheels while the front is pushed downwardly. In the latter situation, the towed load pressure may even cause gyrations and involuntary directional pulls that could ultimately cause the driver of the towing vehicle to lose control and even result in an accident.

Hence, there persists a need for a more durable multiple use hitch mount built to withstand the load pressure and vibrational rattle and torque and is height adjustable in order to better attenuate the play between the hitch assembly platform and base of the hitch ball member and associated noise, vibration and sway.

SUMMARY OF THE INVENTION

Addressing such and other drawbacks, various embodiments are drawn toward a hitch assembly and method of for a hitch mount having a channel member and multiple hitch member having a block base with a dampening member affixed such that coupling of the multiple hitch member by locked engagement of received through holes of the block base and paired side holes disposed in flanges of the channel member adapted to a height corresponding to a trailer or tow accessory secured thereto. A particularly advantageous feature of preferred embodiments is provided by inserting a dampening member between the base of a tow accessory and a hitch receiver platform. Engagement of the hitch member base with the hitch platform channel member thereby compresses the dampening member against the recessed column of the channel member, the dampening member. The dampening member thus absorbs and attenuates impacts exerted from the movement of a vehicle and tow accessory, dissipates load and dampens noise emanating from rubbing at the tow mount base and hitch platform junction, thereby reducing associated play, vibration and resulting rattling and swaying.

A particular advantage imparted by affixing the dampening member to the tow accessory to thereby engage with the recessed column of the hitch platform as described and claimed herein efficaciously deploys dampening of the tow hitch member and receiver platform junction in all positions regardless height adjustments thereto.

The hitch dampener assembly of this invention reduces movement, rub and associated friction between a hitch platform and a hitch mount member and thus quiets any associated vibration, rattle and noise emanating therefrom. In the embodiments described and claimed herein, the hitch platform has a shank tube portion configured for telescoped seating within a receiver tube attached to a vehicle affixed in perpendicular orientation to a channel portion including a recessed column perpendicularly disposed between opposed flanges having side holes spaced in corresponding paired alignment.

In particular embodiments, this multiple hitch assembly for mounting a tow accessory, such as a trailer or cargo carrier includes a hitch platform, multiple hitch member and a locking pin. The hitch platform has a shank tube member having an elongate end portion configured for telescoped coupled engagement within a receiver tube attached to the tow vehicle, a channel member having a recessed column disposed between opposed flanges, wherein the shank tube member is affixed to a back surface of the recessed column such that the channel member is disposed along a substantially perpendicular axis along an opposing end to the elongate end portion of the shank tube, a plurality of spaced pairs of aligned side holes disposed in the opposed flanges. The multiple hitch member includes a block base configured for slidable correspondence with a channel member having a recessed column disposed between opposed flanges, wherein the block base has two pairs of transverse side surfaces extending between a rear surface and a distal pedestal, and wherein at least one through hole for aligned correspondence to the aligned side holes is disposed between one of the transverse side surfaces. A plurality of integral hitch mount members are outwardly disposed from the pedestal. A dampening member on the rear surface of the block base is disposed such that the dampening member abuts the recessed column of the channel portion when locking member configured for coupling the through hole of the base portion between the aligned side holes is secured in locked engagement with the side holes of the channel member compresses the dampening member upon the recessed column of the channel portion to thereby dampen noise emanating from rubbing of the hitch platform and the hitch member.

he multiple hitch member pedestal includes multiple functional elements which may include hitch receiver balls of differing dimensions, various tow hooks and/or a step member. The base block and particularly the through holes are configured so as to receive the locking member whereby the hitch member is engageable to orient the functional elements corresponding use positions. For example, receiver balls and step members are capable of being position in an upward facing orientation to thereby respectively facilitate mounting of a corresponding socket thereon or access to a rooftop surface and elevated objects.

The multiple hitch member of the present invention may further include tow hook, a clevis hook, a closed O-shaped pintle, D-shaped aperture, as well as, a J-shaped hook.

The plurality of multiple hitch members may include at least one hitch receiver ball, and at least one tow hook member, wherein the at least one hitch receiver ball and the at least one tow hook member are disposed in opposed transverse orientation. Embodiments of the multiple hitch member may further include a step member configured such that the hitch member is capable of being engaged within the hitch platform so as to position the step member in an upward facing orientation to thereby facilitate access to a rooftop surface and elevated objects and wherein a step member is disposed between the hitch receiver ball and the tow hook members.

According to various embodiments of the present invention, the multiple hitch member is secured to the corresponding holes of the flanges of the channel member by a locking member that includes at least one elongate pin. Preferred embodiments employ a locking member including two elongate pins. Some embodiments orient the two elongate pins such that one elongate pin is aligned in a direction crossing another of the two elongate pins. In particularly preferred embodiments, the elongate pins are preferably two clip pins, each having a pin configured for coupled engagement with corresponding aligned side holes, and wherein each of the two clip pins has a clip pin hole configured for locked engagement with a pair of corresponding clips to thereby secure the elongate pins to avoid being dislodged from the corresponding side holes of the channel member and through holes of the block base in order to secure the multiple tow hitch member in locked engagement within the channel member.

The through holes of the base are dimensioned such that the locking member is capable of detachably coupling the corresponding aligned side holes of the channel member so as to selectively orient the multiple tow hitch member to thereby adjust the height of the multiple hitch assembly while the hitch platform is in coupled engagement with the tow vehicle.

The vibration dampening member according to the present invention may be composed of an elastomer or any pliable or flexible material capable of absorbing impacts, vibrations and attenuating movement between abutting and adjacent surfaces of a receiver ball or other tow accessory and a hitch receiver. One exemplary embodiment of the present invention includes a rubber or elastomer dampening member.

Further features and particular efficacies of the present invention are drawn toward a multiple hitch assembly for mounting a tow accessory or a trailer to a tow vehicle having a dampening member for reducing the vibration noise and rattle emanating from the hitch platform and the multiple hitch member, that may be exacerbated with the added mass and density of the multiple tow member and pressure of heavy trailers or loads often towed by such assemblies. Embodiments of the present invention include a hitch platform having a shank tube member having an elongate end portion configured for telescoped coupling within a receiver tube attached to the tow vehicle, a channel member having a recessed column disposed between opposed flanges, wherein the shank tube member is affixed to a rear surface of the recessed column such that the channel member is disposed along a substantially perpendicular axis along an opposing end to the elongate end portion of the shank tube. The channel member has a plurality of spaced pairs of aligned side holes disposed in the opposed flanges and is configured for slidable seating of a block base of a multiple tow hitch member having a block having at least one through hole for locking into aligned correspondence with the aligned side holes. Protruding from a distal end opposing a rear surface of the block base is a unitary distal pedestal.

In preferred embodiments, the plurality of hitch mounts includes three hitch receiver balls of different dimensions. The hitch ball receivers in particularly preferred embodiments may include standard size ball hitches of about 1.25×1.25 inches (3.2×3.2 cm), 1.9×1.9 inches, (4.75×4.75 cm), 2.7×2.7 inches (5.6×5.6 cm). Alternative embodiments may combine or substitute standard for irregular size hitch mounts or hitch mounts adapted for particular uses may be included in a multiple hitch member adapted to be received in a hitch receiver that is attached to the tow vehicle. Such multiple hitch mounts, may also include alternative tow mount configurations, integrating, for example a tow hook, clevis hook or pintle or alternative hitch mount or feature such as a step member may be provided on the hitch member, such that another type of a trailer or accessory not having a ball hitch may be towed by the tow vehicle.

The multiple hitch assembly also includes a step member integrally formed onto the pedestal. In preferred embodiments, two of the three hitch receiver balls are disposed in opposed transverse orientations and the step member is disposed in opposed transverse orientation to another of the three hitch receiver balls. In some preferred embodiments, the step member is a planar surface of a generally rectangular configuration dimensioned to accommodate one foot or both feet of a user and om particularly preferred embodiments, an upper surface of the step member has skid resistant indentations.

In some embodiments, the locking member coupling the through hole of the hitch member block base to the aligned side holes of the receiving channel is at least one elongate pin. In preferred embodiments, two elongate pins. It is particularly preferred that in alternative embodiments, the two elongate pins are oriented such that the at least one elongate pin is aligned in a direction crossing another of the two elongate pins. Preferred embodiments further feature a locking member including two clip pins configured for coupled engagement with corresponding aligned side holes and a clip pin hole and wherein the clip is configured to secure the clip pin within the selected corresponding aligned side holes when coupled in locked engagement with the clip pin hole.

A yet further feature of the present invention is the dimensioning and spacing of one or more through holes of the block base such that the hitch assembly member may be detachably coupled to the channel member of the hitch platform so as to alternatively adjust the height of the multiple hitch assembly while the hitch platform is in coupled engagement with the tow vehicle. Embodiments also include dimensioning the block base such that the locking member is capable of detachably coupling the through holes so as to detachably couple the multiple tow hitch member to selectively orient a one of the hitch balls and step in an upward use position while the hitch platform is in coupled engagement with the tow vehicle.

The present invention further provides a method for providing a multiple hitch assembly for mounting a trailer to a tow vehicle, comprising steps that include providing a channel member having a recessed column disposed between opposed flanges with a plurality of spaced pairs of aligned side holes, wherein a shank tube member integrally connected to a rear surface of the recessed column such that the channel member is disposed at a substantially perpendicular orientation to the longitudinal axis of the shank tube, disposed between opposed dual flanges and providing a multiple hitch member having a block base dimensioned for slidably fitted correspondence with the channel member, wherein the block base has a rear surface with an affixed dampening member, and wherein the block base has a plurality of through holes spaced and sized for coupled engagement with the plurality of corresponding aligned side holes, and wherein an integral pedestal extending from the block base includes a plurality of hitch mounts extending in different directions from the pedestal; and detachably coupling the through holes of the multiple hitch member and the aligned side holes of the channel member so as to alternatively secure the hitch balls and step to a selected use orientation at a selected height so as to compress the dampening member between the rear surface of the block base and the recessed column of the channel member. A further step of the method includes detachably coupling the corresponding aligned side holes of the channel member so as to selectively orient the multiple tow hitch member to thereby adjust the height of the multiple hitch assembly while the hitch platform is in coupled engagement with the tow vehicle.

As used herein, "multiple hitch member" refers to a multiple use hitch mount that may include differently sized single, dual, triple or any hitch ball mount, and variously configured tow hooks or rings, including a clevis hook, pintle or O-shaped hook, D-shaped as well as a J-shaped extension or other hitch mount member adjustably mounted on a channel mount platform. The "multiple hitch member" may optionally include a step member for facilitating access to a rooftop surface and elevated objects not readily reached from ground level. This "multiple hitch member" is adaptable to various tow accessories including trailers and other carriers such as bicycle or recreational equipment racks, storage decks, boxes, cages and other types of tow accessories and has a height adjustable hitch platform capable of being adapted to the height of a particular tow accessory while coupled within a receiver tube attached to a vehicle.

These and other features will be evident from the ensuing detailed descriptions of representative exemplary embodiment below and from the drawings.

DETAILED DESCRIPTION OF PREFERRED EMBODIMENTS

Figure 1:
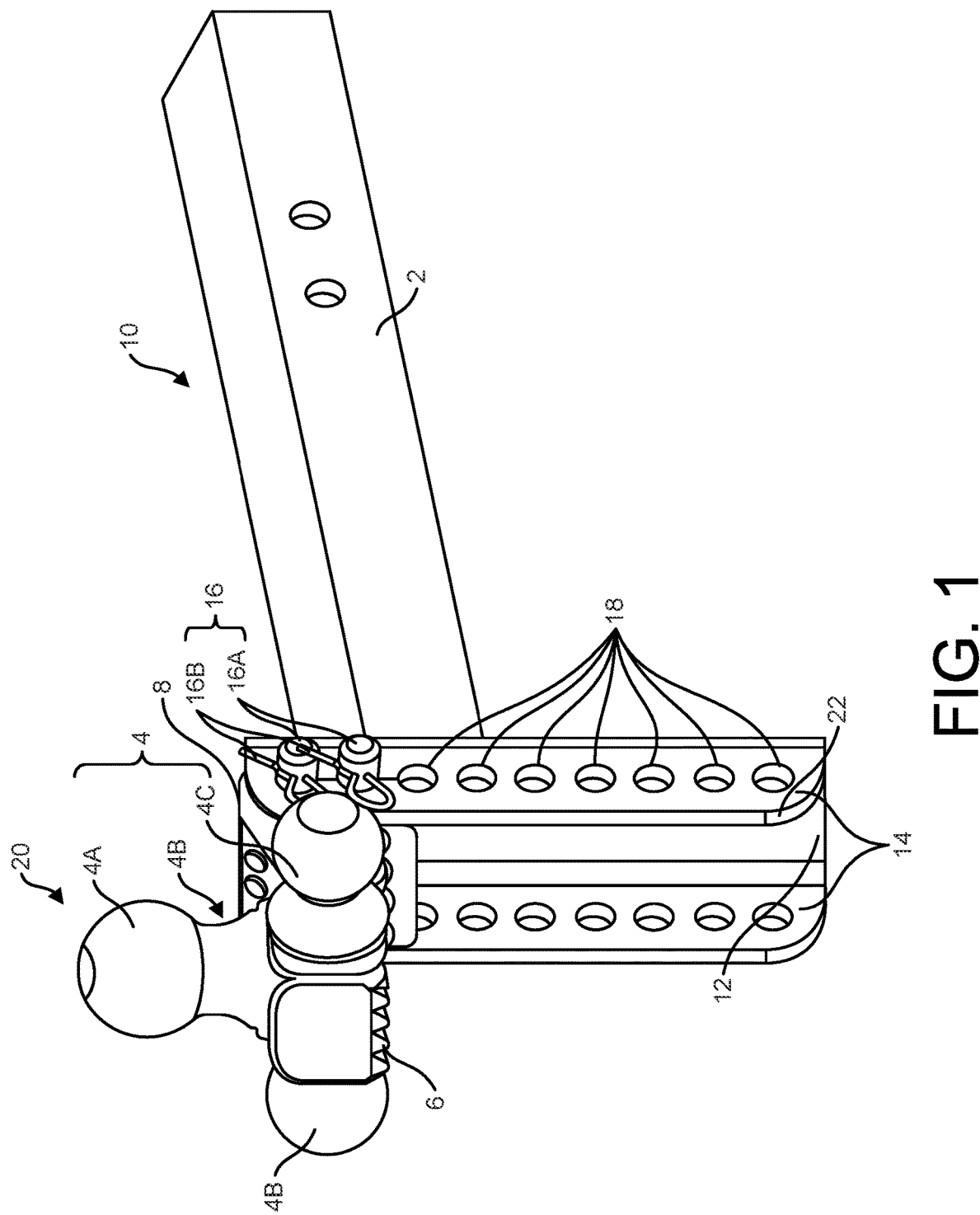
FIG. 1 is a side perspective view of an exemplary embodiment of the multiple hitch assembly of the present invention having a triple hitch ball and step assembly shown attached to a channel member.
Figure 2:
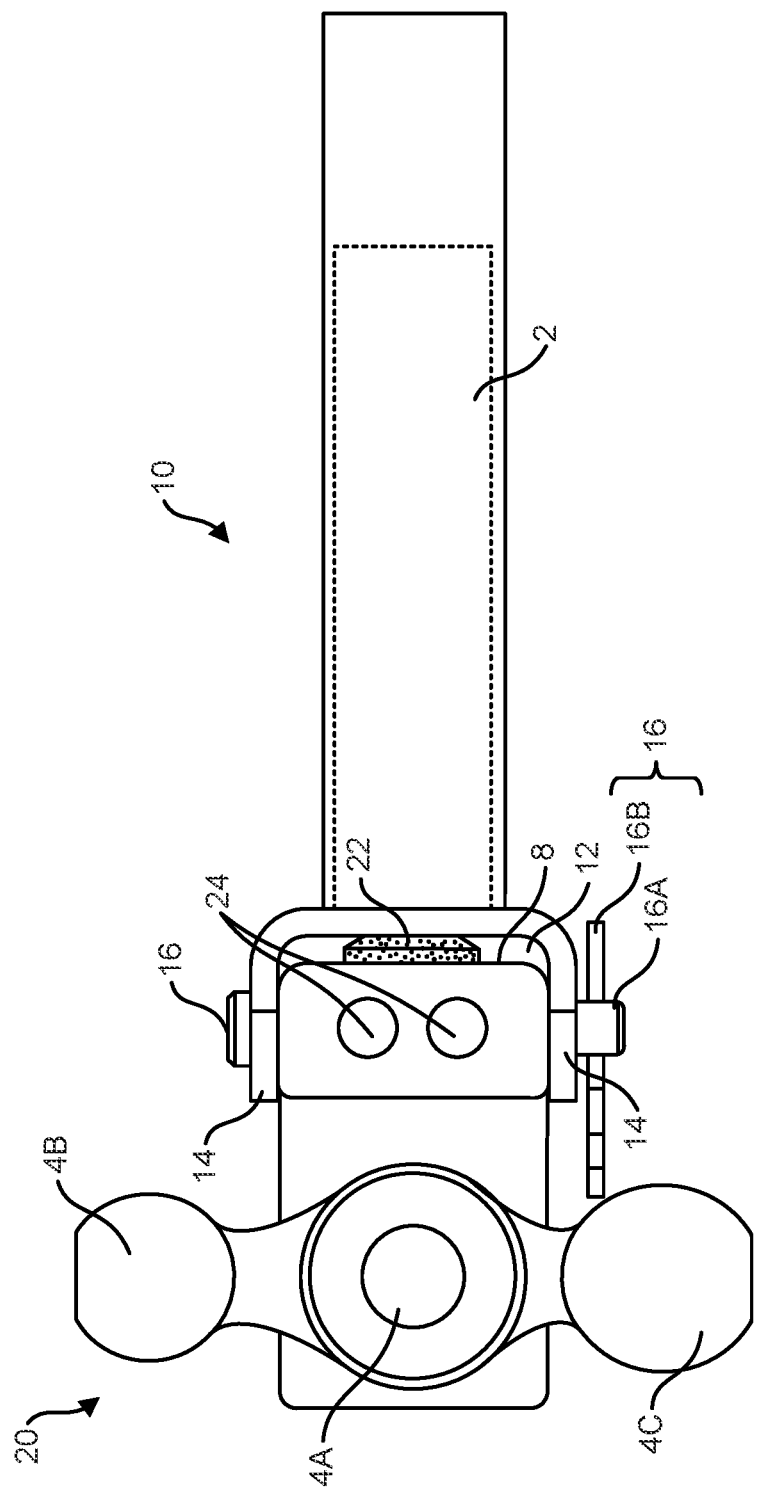
FIG. 2 is a top view of the exemplary multiple hitch ball assembly shown in FIG. 1 shown attached to a receiver tube.
Figure 3:
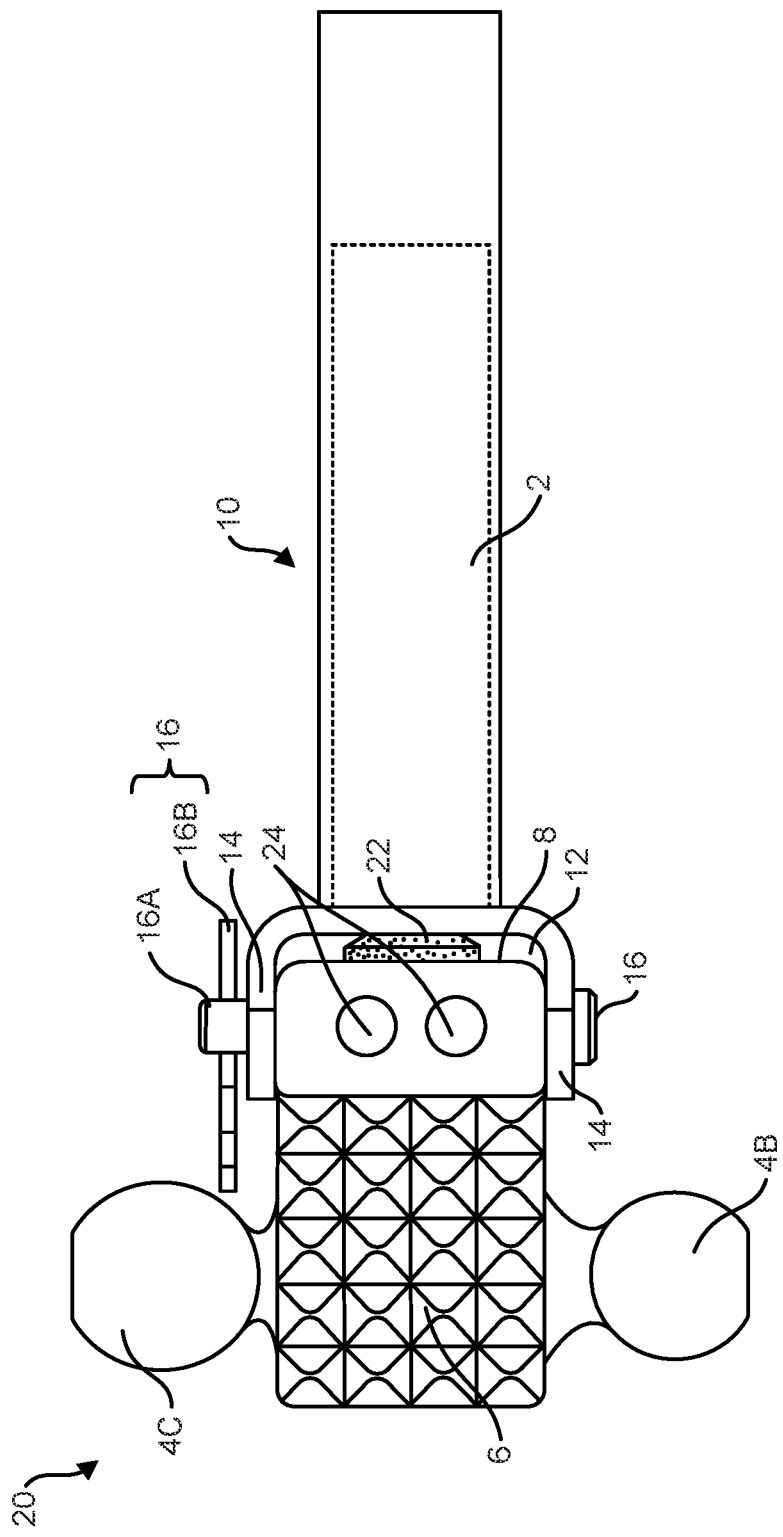
FIG. 3 is a bottom view of the exemplary multiple hitch ball assembly shown in FIGS. 1 and 2.
Figure 4:
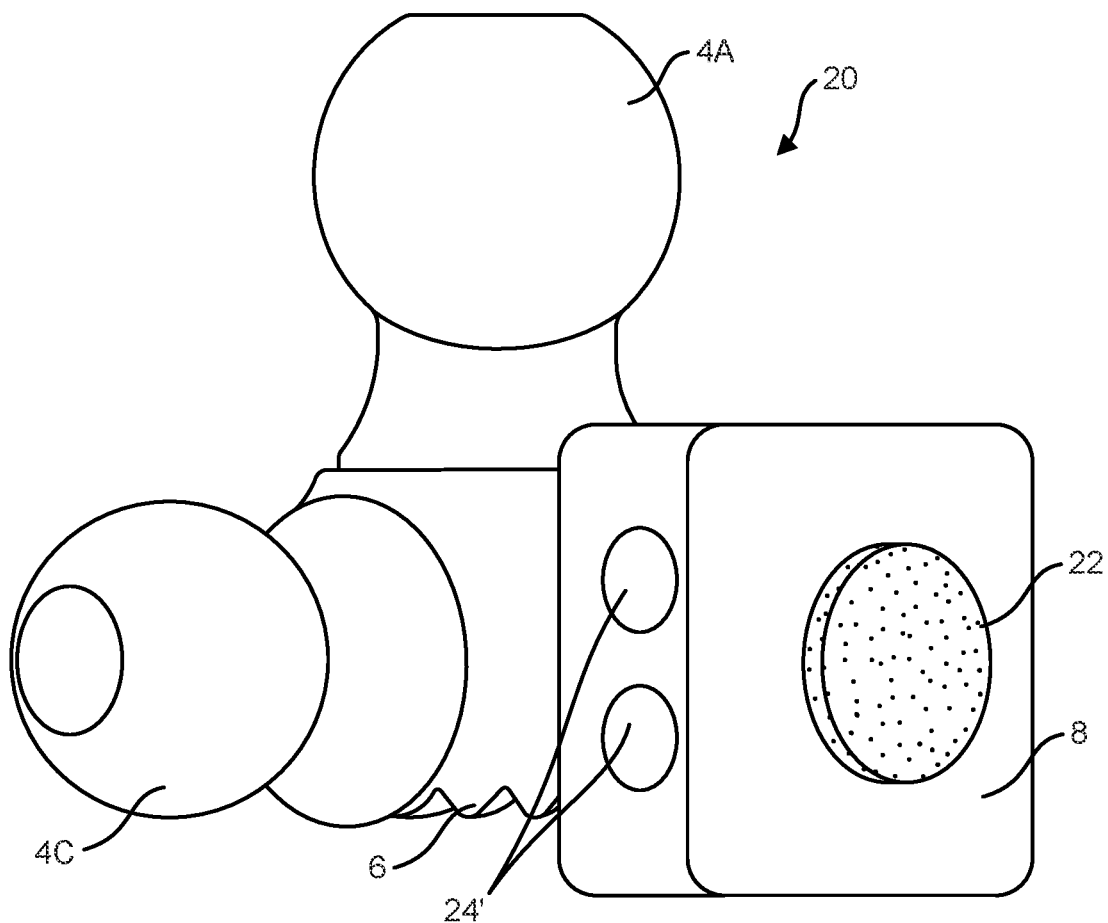
FIG. 4 is a side perspective view of the exemplary multiple hitch member having a triple hitch ball.
Figure 5:
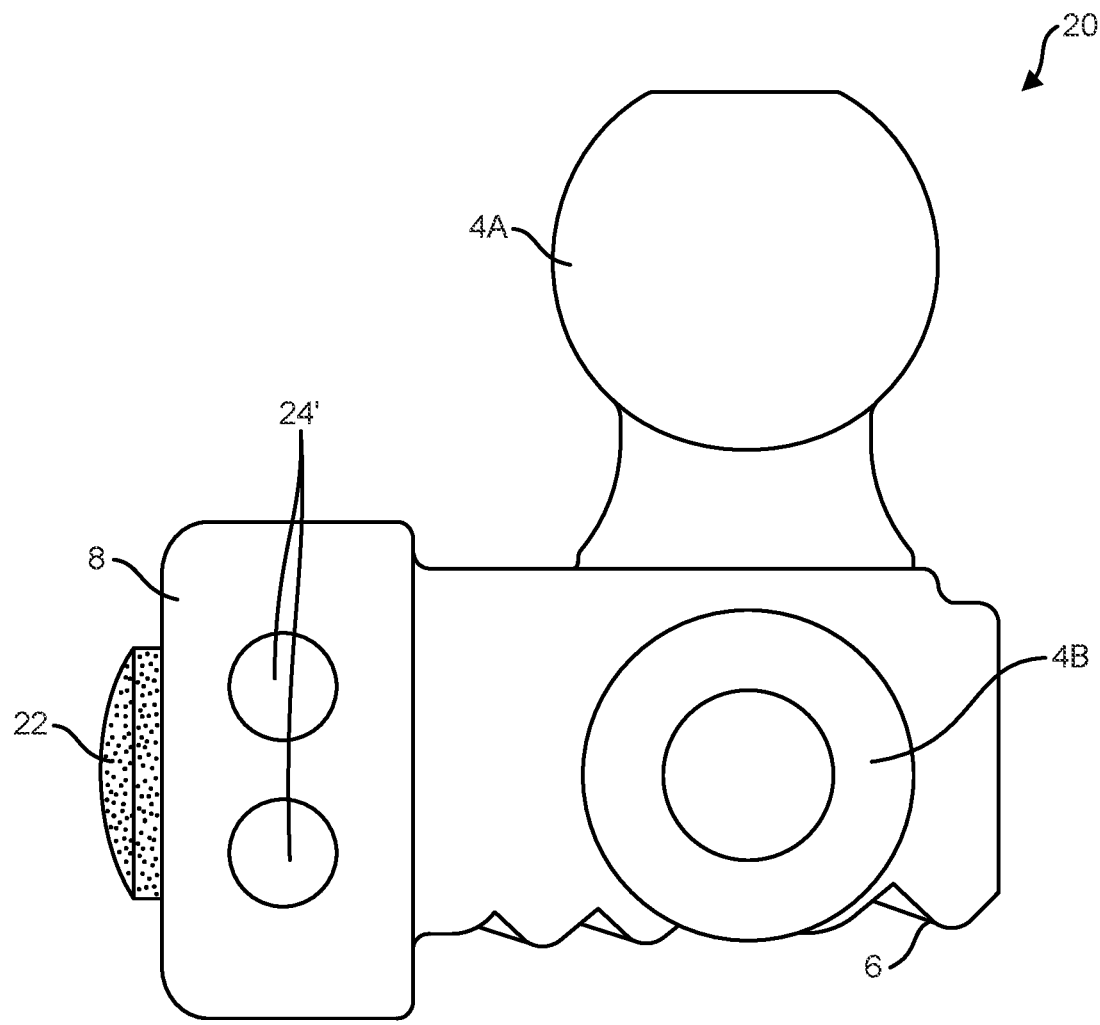
FIG. 5 is a side view of the exemplary multiple hitch member having a triple hitch ball.

Exemplary embodiments of the present invention illustrated in FIGS. 1-10 depict alternative configurations of the multiple hitch assembly that may include a plurality of hitch balls, tow hooks and a step mount integrally disposed in different directions from a pedestal of a block base having a dampening member affixed to the rear surface such that the dampening member 22, 22' and 22" affixed directly to the back surface of a base portion 8, 8' and 8" of a dual flange ball tow mount hitch member 20.

It is to be expressly understood that the illustrative embodiment is a representation of the invention for explanatory purposes only and is not meant to unduly limit the claimed invention. The representative embodiment of the present invention is intended for use with receiver hitch systems including trailer mounts but also includes other dual or triple hitch mount configurations with or without a step hitch member such as detailed below. The illustrated as well as alternative embodiments may be used for original equipment installations and as an after-market accessory.

In the exemplary embodiment shown in FIGS. 1-5, multiple hitch member 20 includes a triple ball and step member disposed on a distal end of a shank tube hitch platform 10 is attachable within a corresponding receiver tube mounted beneath a bumper of a vehicle by well-known mounting techniques, such as by bolting or welding (not shown). In the illustrated embodiment, a platform shank tube 2 is sized and configured for telescoped seating within a 1½ inch square or 2-inch square receiver tube (internal dimensions). As is readily apparent, the hitch dampener assembly of the present invention may be employed with other sizes of shapes of hitch receiver tubes.

As shown in FIGS. 1-5, multiple hitch member 20 includes triple ball mounts 4A, 4B and 4C and step member 6 extending from a block base 8 sized and configured for slidably fitted correspondence within the recessed column of universal hitch platform 10. However, the scope of the claimed invention extends to other mount assemblies including but not limited to single or multiple hitch balls, pintle or O-shaped hook, step members or any mount for cargo, bicycles, motorcycles, wheelchairs, or carriers mounted thereon, such as, for examples cargo containers, platforms and other types of receiver mounted devices.

Figure 6:
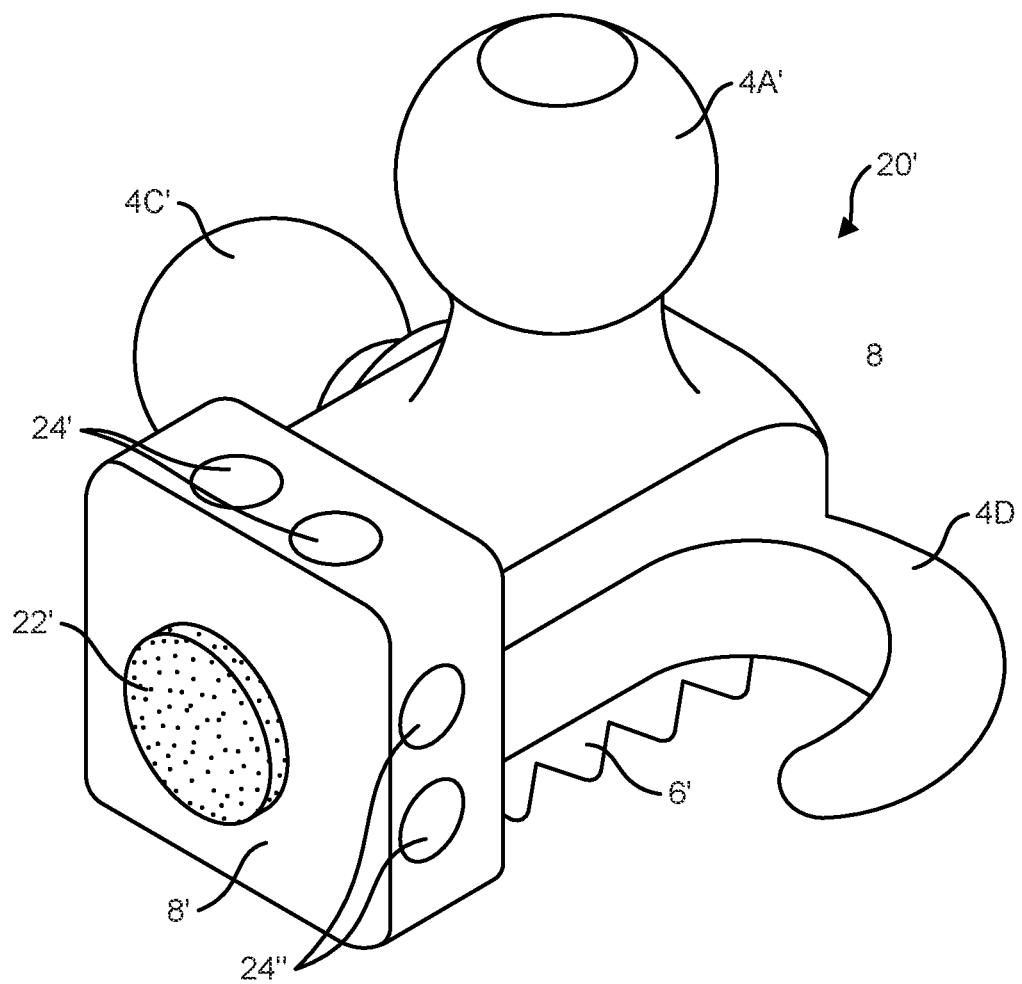
FIG. 6 is a side perspective view of an exemplary embodiment of the multiple hitch assembly having a tow hook and a dual hitch ball.
Figure 7:
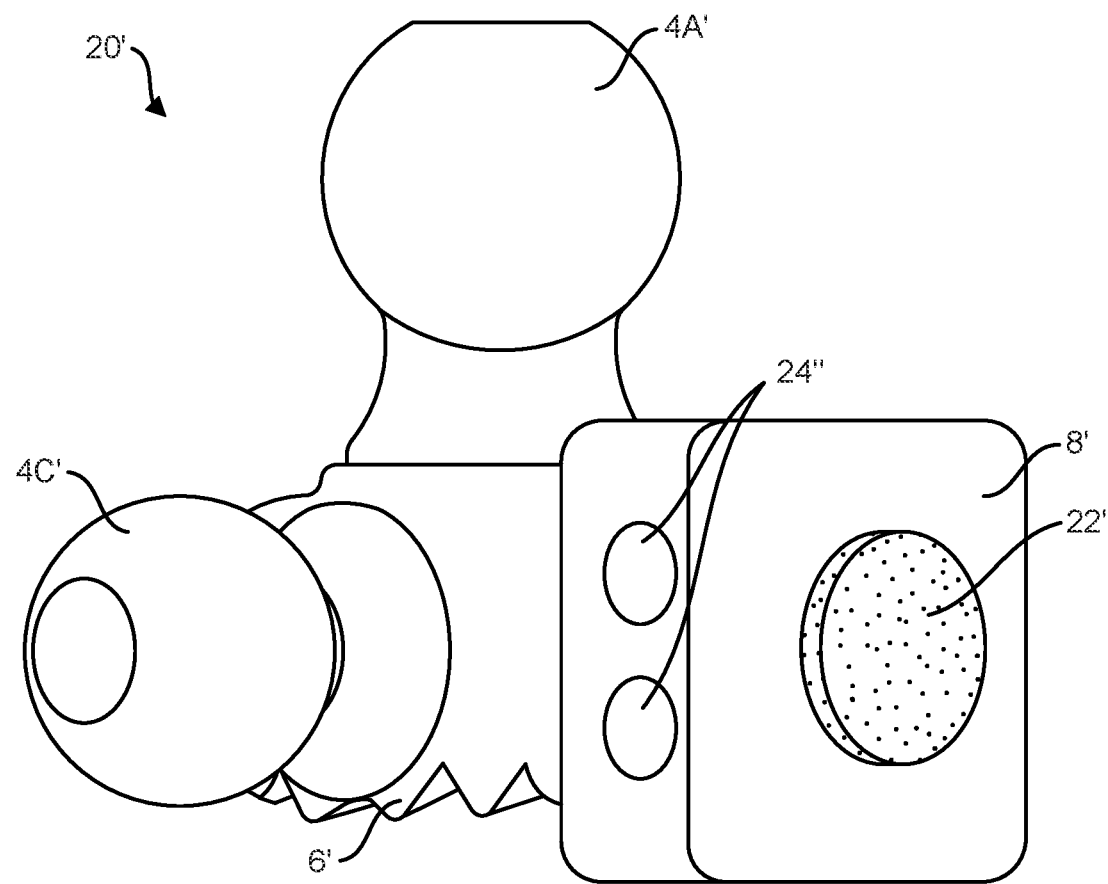
FIG. 7 is another side perspective view of the exemplary multiple hitch assembly having a tow hook and a dual hitch ball.
Figure 8:
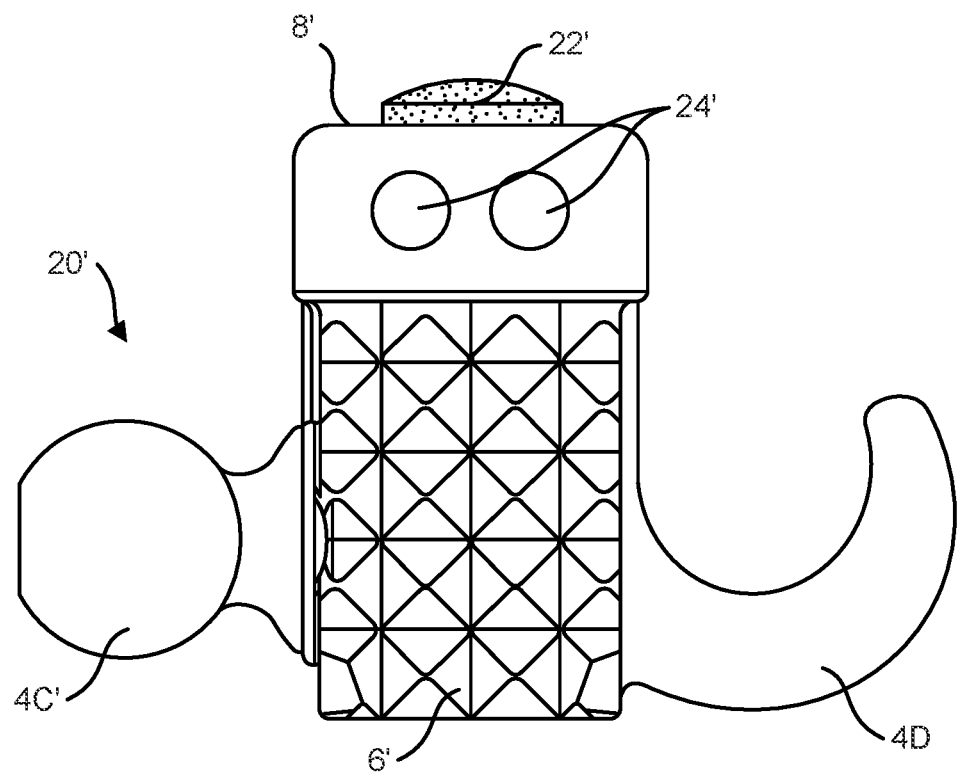
FIG. 8 is a bottom view of the multiple hitch member having a tow hook and a dual hitch ball.

Referring to FIGS. 6-8, an alternative embodiment provides transversely disposed dual receiver balls 4A' and 4B" with tow hook 4D" positioned on an opposing side step hitch 6' on a base block 8' in multiple hitch member 20'.

Figure 9:
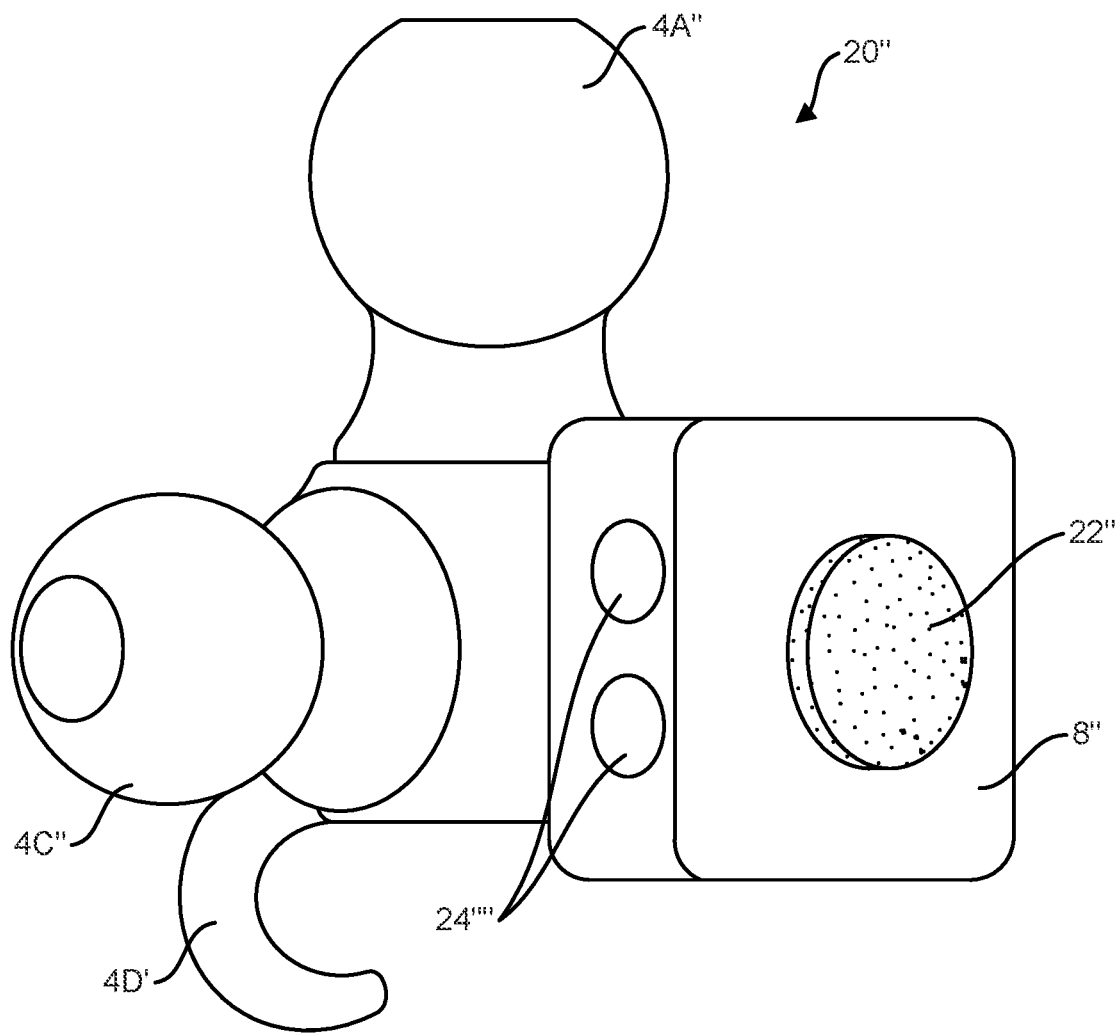
FIG. 9 is a side perspective view of the multiple hitch member having a tow hook and a triple hitch ball.
Figure 10:
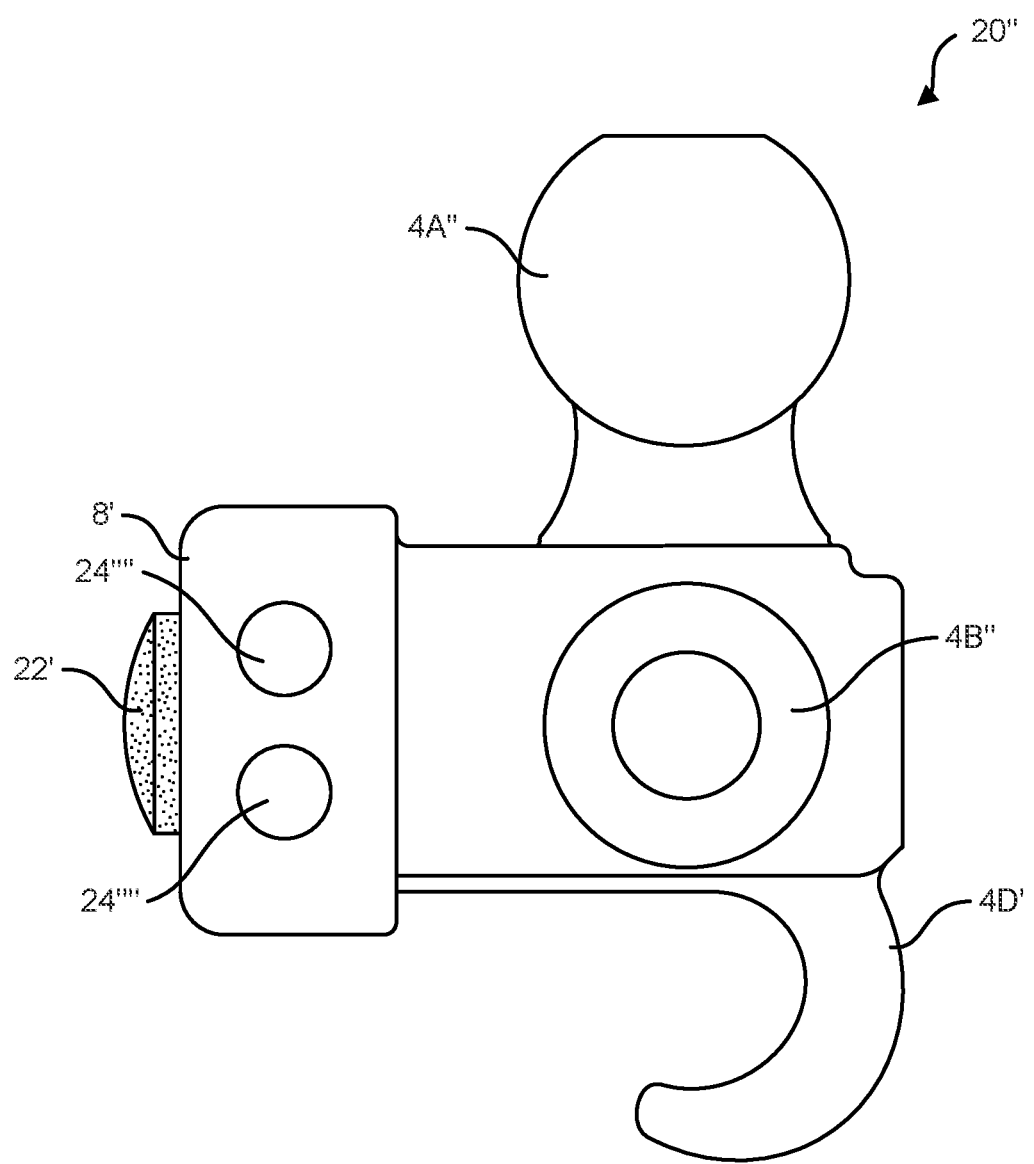
FIG. 10 is a side view of the multiple hitch member having a tow hook and a triple hitch ball.

Now referring to FIGS. 9-10, another exemplary embodiment shown as multiple hitch member 20" includes triple hitch ball 4A", 4B" and 4C" with tow hook 4D' extending from block base 8 to which dampening pad 22'" is affixed. In yet other embodiments, tow hook 4D, 4D' may be a clevis hook, pintle or O-shaped hook or be configured as a J-shaped, D-shaped, or other tow fastener adapted to a particular tow accessory.

In the illustrated embodiments of FIGS. 1-10, base block 8 and 8', 8'" includes through holes 24 and 24' and 24'" and 24"" respectively configured for adaptably rotating block base 8 and secure in coupled engagement with corresponding aligned side holes 18 and 18'. Elongated pins 16 are successively received through aligned side hole 18, through holes 24 and 24' and corresponding aligned side holes 18 to couple the block base 8 within a channel member 12 formed between opposing dual flanges 14 and recessed column such that securing elongated clip pins 16 by insertion of locking clips 16B through holes on ends of elongated pins 16A affixes tow hitch member 20 into locked engagement and thereby compresses the vibration dampening member 22 upon the inner recessed column 8 between opposing dual flanges 14 of hitch platform 10.

In the exemplary embodiments as shown in FIGS. 1-8, step member 6 and 6' has an upper planar surface of a generally rectangular configuration dimensioned to accommodate one foot or both feet of a user. As shown, the illustrated step hitch 6 also includes linear grooves and protrusions to grip the sole of the user and thereby protect against slipping and falling. It can be readily surmised that in alternative embodiments the step member may be variously dimensioned to facilitate a desired function or design.

Hitch dampening member 22, 22' and 22" according to the present invention is shown as circular in shape and measures about 1½ inches (3.8 cm) in diameter. However, alternative configurations of the dampener dimensions may vary in accordance with the use and dimensions of the respective platform, tow accessory and vehicle in connection with which it is being deployed.

The composition of the illustrated hitch dampening member is preferably a polymeric rubber material. In particular, the body of hitch dampening member may be composed of any elastomer, or pliable, impact or vibration-absorbing material of suitable density, flex, and durability. Such compositions are functionally adaptable to dampen, buffer, dissipate or attenuate impact and torque associated with load strain exerted by an external force. The impact absorbing or dampening composition of vibration dampening member 22, 22' and 22" is configurable in any suitable size and shape such as, for example, a curved or circular device, bumper, washer, block, sheet, sleeve or other form that is adaptable to the geometry of the tow hitch platform and mount member.

Hitch dampening member 22, 22', and 22''' may be affixed by a single metal screw or multiple screws, or alternatively be fused, embedded or adhered to the back of the dual ball base with an industrial strength epoxy, or utilizing other means or materials well known in the art.

A representative embodiment of this dampening member particularly suitable for after-market applications includes a combination of rubber and metal screw thread configured to engage a corresponding threaded hole the back surface of the tow hitch member base.

Moreover, the shape of the hitch dampening member 22, 22' and 22''' of the present invention can take on various configurations which may include linear, curvilinear, convex or concave portions. The scope of the present invention expressly contemplates and includes any shape as well as composition providing without limitation, vibration and impact absorption capacity, pliability, tensile strength and density. The extent of such absorption and attenuation is commensurate to the hitch dampening member composition's composition and associated mechanical properties.

As will be apparent to persons of ordinary skill in the art of tow hitch assembly design and engineering, the extent and impact receiving and attenuation capacity of the device of the present invention correlates to the dampener surface area, thickness and density. More specifically, the vibration dampening member 22, 22', and 22" surface area, thickness and density comports with the connection tension of the hitch vibration dampening assembly exerted which is a function of the weight, shape and size, aerodynamics as well as force and torque exerted on the tow hitch assembly when in use.

It is to be expressly understood that the descriptive embodiment is provided herein for explanatory purposes only and is not meant to unduly limit the claimed inventions. The preferred embodiment of the present invention is intended for use with receiver hitch systems including trailer mounts as well as other tow accessories. The preferred embodiment may be used for original equipment installations and as an after-market item.

Hence, it is to be further expressly understood that these exemplary embodiments are provided for descriptive purposes only and not meant to unduly limit the scope of the claimed inventions. Other embodiments are also considered to be within the scope of the present inventions.

The invention claimed is:

1. A hitch assembly for mounting a tow accessory, comprising:
    a hitch platform having
        a shank tube member having an elongate end portion configured for telescoped coupled engagement within a receiver tube attached to the tow vehicle,
        a channel member having a recessed column disposed between opposed flanges, wherein the shank tube member is affixed to a back surface of the recessed column such that the channel member is disposed along a substantially perpendicular axis along an opposing end to the elongate end portion of the shank tube,
        a plurality of spaced pairs of aligned side holes disposed in the opposed flanges;
    a hitch tow member having
        a block base member configured for slidable correspondence with the channel member, wherein the block base has two pairs of transverse side surfaces extending between a flat rear surface and an integral pedestal, and having at least one through hole for aligned correspondence to the aligned side holes disposed between one of the two pairs of transverse side surfaces, wherein the pedestal has an integral receiver end for detachable hitch mounting of the tow accessory; and
    at least one locking member configured for coupling the through hole of the base portion between the aligned side holes of the channel member such that locked engagement of the locking member with the side holes compresses the flat rear surface of the block base upon the recessed column of the channel portion of the hitch platform to thereby secure the hitch member in squared alignment within the channel member.

2. The hitch assembly of claim 1, such that no portion of the block base extends beyond an end of the channel member when the block base is engaged within the channel member, and further comprising a dampener pad affixed in abutted alignment to the flat rear surface of the base block such that the dampener pad moves along a vertical axis in tandem with the hitch tow member.

3. The hitch assembly of claim 2, wherein the integral receiver end includes a plurality of hitch mount receiving mechanisms for attaching a tow accessory, and wherein the block base is dimensioned such that the locking member is capable of detachably coupling the through holes so as to detachably couple the hitch tow hitch member to selectively orient any one of the plurality of hitch mount receiving mechanisms in an upward use position while the hitch platform is in coupled engagement with the tow vehicle.

4. The hitch assembly of claim 3, further comprising a dampener pad affixed to the flat rear surface of the block base such that the dampener pad is compressed upon the recessed column when the hitch member is secured in locked engagement to the channel member, and wherein the dampener pad moves along a vertical axis in tandem with the hitch tow member.

5. The hitch assembly of claim 4, wherein the plurality of hitch mount receiving mechanisms includes at least at least one of a group consisting of: at least two hitch receiver balls of differing diameters, a tow hook member and a step member.

6. The hitch assembly of claim 5, wherein the plurality of hitch mount receiving mechanisms includes two hitch receiver balls of differing dimensions outwardly disposed along a single linear axis.

7. The hitch assembly of claim 6, further comprising a step member disposed between the at least two hitch receiver balls, wherein the step member is configured such that the hitch tow member is capable of being engaged within the hitch platform so as to alternatively position the hitch receiver balls and the step member in an upward facing orientation.

8. The hitch assembly of claim 7, wherein the plurality of hitch mount receiving mechanisms includes three hitch balls of different dimensions, and wherein two of the three hitch ball mounts are disposed outwardly in opposed transverse orientation along a single linear axis, and further includes a step member disposed between the two opposed receiver balls in opposed transverse orientation to another of the three hitch ball mounts, and wherein the step member and the three hitch ball mounts are configured such that the hitch tow member is capable of being engaged within the hitch platform so as to alternatively position the three hitch ball mounts and the step member in an upward facing orientation.

9. The hitch assembly of claim 8, wherein the step member has a planar surface of a generally rectangular configuration dimensioned to accommodate one foot or both feet of a user.

10. The hitch assembly of claim 2, wherein the plurality of hitch mount receiving mechanisms includes at least one of the group consisting of: a clevis hook, a pintle ring, a D-shaped aperture, and a J-shaped hook.

11. The hitch assembly of claim 2, wherein the plurality of hitch mount receiving mechanisms includes at least one hitch receiver ball, and at least one tow hook member, wherein the at least one hitch receiver ball and the at least one tow hook member are disposed in opposed transverse orientation.

12. The hitch assembly of claim 2, further comprising a step member configured such that the hitch member is capable of being engaged within the hitch platform so as to position the step member in an upward facing orientation to thereby facilitate access to a rooftop surface and elevated objects, and wherein a step member is disposed between the hitch receiver ball and the tow hook member.

13. A multiple hitch assembly for mounting a tow accessory, comprising:
    a hitch platform having
        a shank tube member having an elongate end portion configured for telescoped coupled engagement within a receiver tube attached to the tow vehicle,
        a channel member having a recessed column disposed between opposed flanges, wherein the shank tube member is affixed to a back surface of the recessed column such that the channel member is disposed along a substantially perpendicular axis along an opposing end to the elongate end portion of the shank tube,
        a plurality of spaced pairs of aligned side holes disposed in the opposed flanges; and
    a multiple hitch member having
        a block base configured for slidable correspondence within the channel member to thereby secure the hitch member in squared alignment within the channel member, wherein the block base has two pairs of transverse side surfaces extending between a rear surface and an integral pedestal, wherein at least one through hole for aligned correspondence to the aligned side holes is disposed between one of the transverse side surfaces, wherein the pedestal has an integral receiver end including a plurality of hitch mount receiving mechanisms outwardly disposed from the pedestal, and wherein the plurality of hitch mount members includes at least one hitch receiver ball, and at least one tow hook member such that the at least one hitch receiver ball and the at least one tow hook member are outwardly disposed in opposed transverse orientation,
        a dampener pad disposed on the flat rear surface of the block base such that noise is dampened at any height when the block base is engaged within the channel member, and
        at least one locking member configured for coupling the through hole of the base portion between the aligned side holes such that locked engagement of the locking member with the side holes compresses the dampener pad upon the recessed column of the channel portion.

14. The multiple hitch assembly of claim 13, wherein the multiple hitch member further includes a step member configured such that the multiple multiple hitch member is capable of being engaged within the hitch platform so as to position the step member in an upward facing orientation to thereby facilitate access to a rooftop surface and elevated objects.

15. The multiple hitch assembly of claim 3, wherein the locking member includes two clip pins, each having a pin configured for coupled engagement with corresponding aligned side holes, and wherein each of the two clip pins has a clip pin hole configured for locked engagement wherein the at least one elongate pin are two elongate pins configured for coupled engagement with corresponding aligned side holes of the channel member and through holes of the block base and further comprising a pair of corresponding clips configured for secured coupling with a pair of corresponding clip pin holes and thereby affix the two elongate pins such that the multiple hitch member is secured in locked engagement with the channel member.

16. The multiple hitch assembly of claim 13, wherein the through holes of the block base are dimensioned such that the locking member is capable of detachably coupling the corresponding aligned side holes of the channel member so as to selectively orient the multiple tow hitch member to thereby adjust the height of the multiple hitch assembly while the hitch platform is in coupled engagement with the tow vehicle.

17. The multiple hitch assembly of claim 13, wherein the block base is dimensioned such that the locking member is capable of detachably coupling the through holes so as to selectively orient one of the hitch receiver balls and the step member in the upward facing orientation while the hitch platform is in coupled engagement with a tow vehicle.

18. A method for providing a multiple hitch assembly for mounting a trailer to a tow vehicle, comprising the steps of:
   providing a hitch platform with a channel member having a recessed column disposed between opposed dual flanges, wherein the dual flanges have a plurality of spaced pairs of aligned side holes; and
   providing a multiple hitch member having a block base dimensioned for slidably fitted and squarely aligned correspondence within the channel member, wherein the block base has a flat rear surface with an affixed dampener pad, and wherein the block base has a plurality of through holes spaced and sized for coupled engagement with the plurality of corresponding aligned side holes, and wherein an integral pedestal extending from the block base includes a plurality of hitch mount receiving mechanisms including at least two hitch receiver balls and a step member extending in different directions from the pedestal.

19. The method of claim 18, further comprising the step of detachably coupling the through holes of the multiple hitch member and the aligned side holes of the channel member so as to alternatively secure the hitch receiver balls and the step member to an upwardly facing orientation at a selected height corresponding to a selected use so as to compress the dampener pad between the rear surface of the block base and the recessed column of the channel member such that noise is dampened at a height when the block base is engaged at any height within the channel member.

20. The method of claim 19, further comprising the step of detachably coupling the corresponding aligned side holes of the channel member so as to selectively orient the multiple tow hitch members to thereby adjust the height of the multiple hitch assembly while the hitch platform is in coupled engagement with the tow vehicle.

* * * * *